United States Patent
Zhang et al.

(10) Patent No.: US 8,520,096 B2
(45) Date of Patent: Aug. 27, 2013

(54) APPARATUS AND METHOD FOR LEARNING PHOTOGRAPHING PROFILES OF DIGITAL IMAGING DEVICE FOR RECORDING PERSONAL LIFE HISTORY

(75) Inventors: Byoung-tak Zhang, Seoul (KR); Byung-ho Kang, Daejeon-si (KR); Sung-su Kim, Yongin-si (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 891 days.

(21) Appl. No.: 12/213,289

(22) Filed: Jun. 17, 2008

(65) Prior Publication Data

US 2009/0189992 A1    Jul. 30, 2009

(30) Foreign Application Priority Data

Jan. 30, 2008  (KR) .................. 10-2008-0009493

(51) Int. Cl.
H04N 5/76      (2006.01)
H04N 5/222     (2006.01)

(52) U.S. Cl.
USPC .................................. 348/231.2; 348/333.01

(58) Field of Classification Search
USPC .............. 713/200; 348/231.5, 231.3, 333.01, 348/222.1, 231.2
See application file for complete search history.

(56) References Cited

U.S. PATENT DOCUMENTS

| | | | | |
|---|---|---|---|---|
| 6,930,718 | B2 * | 8/2005 | Parulski et al. | 348/333.11 |
| 2005/0104976 | A1 * | 5/2005 | Currans | 348/231.5 |
| 2005/0172147 | A1 * | 8/2005 | Edwards et al. | 713/200 |
| 2007/0198445 | A1 * | 8/2007 | Zen | 706/15 |

FOREIGN PATENT DOCUMENTS

| | | |
|---|---|---|
| JP | 2004-032129 | 1/2004 |
| JP | 2004-213567 | 7/2004 |
| JP | 2005-260689 | 9/2005 |
| JP | 2005-318574 | 11/2005 |
| KR | 10-2005-0083364 | 8/2005 |

* cited by examiner

*Primary Examiner* — Roberto Velez
*Assistant Examiner* — Tuan Le
(74) *Attorney, Agent, or Firm* — Stass & Halsey LLP

(57) ABSTRACT

Provided are a photographing profile learning apparatus and method of a digital imaging device for recording a personal life history. The photographing profile learning method learns a user's photographing patterns by recommending at least one previous picture consistent with a user's photographing tendencies, using a recommendation function and a user profile based on a user feedback value and a compensation value, receiving user feedback regarding the recommended previous picture, and updating the user profile and the recommendation function according to the user feedback. Therefore, since photographing settings are performed according to a user's tendency and conditions, it is possible to maintain consistency between a currently photographed picture and previously photographed pictures and systematically produce a visual diary.

8 Claims, 4 Drawing Sheets

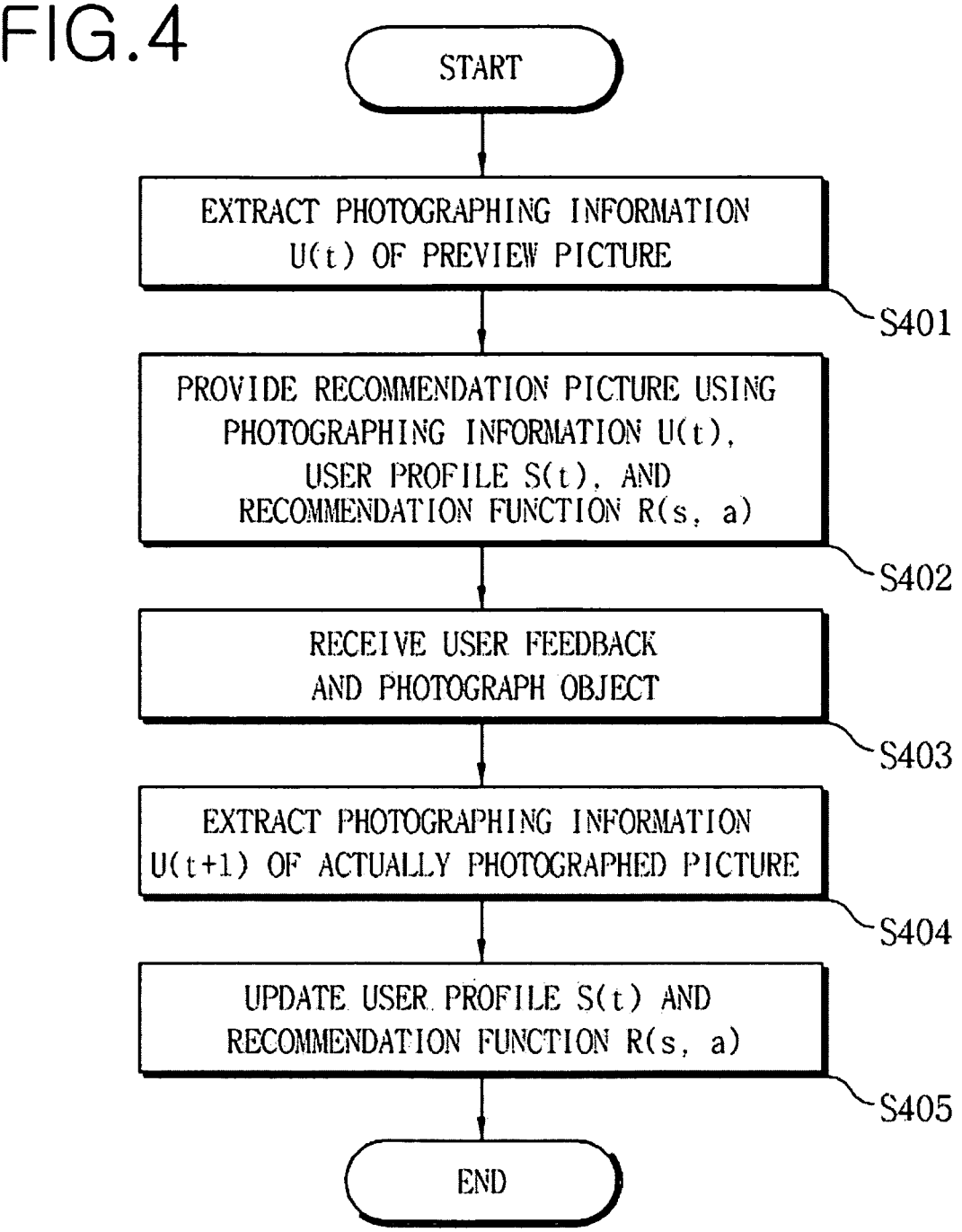

APPARATUS AND METHOD FOR LEARNING PHOTOGRAPHING PROFILES OF DIGITAL IMAGING DEVICE FOR RECORDING PERSONAL LIFE HISTORY

CROSS-REFERENCE TO RELATED APPLICATIONS

This application claims priority from Korean Patent Application No. 10-2008-0009493, filed on Jan. 30, 2008, the disclosure of which is incorporated herein in its entirety by reference.

BACKGROUND

1. Field

One or more embodiments of the present invention relate to a profile learning apparatus and method, and more particularly, to a photographing profile learning apparatus of a digital imaging device, which can learn photographing profiles by recognizing a user's photographing tendencies, and a photographing profile learning method thereof.

2. Description of the Related Art

In general, a digital imaging device converts information about light reflected from an object into an electrical signal, and digitalizes the electrical signal in order to display or store a picture of the object. Such a digital imaging device includes a digital camera, a camera installed in a cellular phone, etc.

Recently, with an increase of people's desires for self-expression, consumers who want to record their daily lives using a digital imaging device are increasing. For this purpose, consumers transmit pictures stored in digital imaging devices to other devices (for example, personal computers (PCs)) to manage the pictures, using an information communications technology, or upload the pictures stored in the digital imaging device on their home pages on the Internet to create a visual diary.

Photographed pictures are sequentially stored in a digital imaging device in an order in which the pictures are taken, or stored according to file names which a user designates to the pictures. Also, the user can create several folders, and store different types of photographed pictures in the respective folders and manage the stored pictures for each folder.

However, there is inconvenience in managing pictures stored in a digital imaging device using the above-described method. For example, when a user wants to create a visual diary on a personal home page on the Internet, he or she will have to examine all the stored pictures separately and consider the conditions in which the pictures were taken, in order to extract and utilize pictures having certain temporal correlations from among the stored pictures. For this reason, there is needed a technique for systematically managing photographed pictures using indexes that reflect a particular user's tendency.

SUMMARY

One or more embodiments of the present invention provide a photographing profile learning apparatus and method of a digital imaging device for recording a personal life history, which can learn a user's photographing patterns by recommending a previous picture related to a picture that is to be taken using a recommendation algorithm, and updating the recommendation algorithm according to the user's feedback regarding the recommended previous picture.

One or more embodiments of the present invention disclose a digital imaging device which can recommend a previous picture which is consistent with a user's photographing tendencies, using a user profile and a recommendation function, and can update the user profile and the recommendation function according to a predetermined compensation value or user feedback regarding the recommended previous picture, thereby learning the user's photographing patterns.

According to an aspect of the present invention, there is provided a photographing profile learning apparatus of a digital imaging device, including a photographing information acquiring unit extracting photographing information of a photographed picture or a preview picture, a photographing recommendation unit searching for at least one previous picture related to the preview picture, selecting at least one recommendation picture in which a user's photographing patterns are most reflected, from among s corresponding at least one found previous picture related to the preview picture, and recommending the at least one recommendation picture to the user, and a photographing profile learning unit updating a search algorithm for searching for the at least one previous picture related to the preview picture and a recommendation algorithm for selecting the at least one recommendation picture based on user feedback regarding the at least one recommendation picture.

The photographing recommendation unit creates a query based on the photographing information of the preview picture and a user profile to search for the at least one previous picture related to the preview picture, and selecting the at least one recommendation picture from among the at least one found previous picture related to the preview picture, using a recommendation function in which the user feedback is reflected.

Also, the photographing profile learning unit updates the user profile using photographing information of a picture actually photographed by the user according to the at least one recommendation picture, and updates the recommendation function based on the updated user profile.

According to another aspect of the present invention, there is provided a photographing profile learning method for recording a personal life story, including extracting photographing information of a preview picture, searching for at least one previous picture related to the preview picture based on the photographing information of the preview picture and a user profile, selecting at least one recommendation picture in which a user's photographing patterns are most reflected, from among a corresponding at least one found previous picture related to the preview picture, using a recommendation function, and recommending the selected at least one recommendation picture to the user, and receiving user feedback regarding the at least one recommendation picture and updating the user profile and the recommendation function according to the user feedback.

According to another aspect of the present invention, there is provided a photographing profile learning method, including extracting photographing information u(t) of a preview picture, creating a query based on the photographing information u(t) of the preview picture and a user profile s(t), and searching for at least one previous picture related to the preview picture based on to the query, selecting at least one recommendation picture in which user's photographing patterns are most reflected, from among a corresponding at least one found previous picture related to the preview picture, using a recommendation function R(s, a) in which related user feedback is reflected, and recommending the selected at least one recommendation picture to a user, receiving user feedback regarding the at least one recommendation picture, extracting photographing information u(t+1) for an actually photographed picture in which the user feedback is reflected, updating the user profile s(t) using the photographing information u(t+1), and updating the recommendation function R(s, a) based on the updated user profile.

Additional aspects of the present invention will be set forth in the description which follows, and in part will be apparent from the description, or may be learned by practice of the invention.

It is to be understood that both the foregoing general description and the following detailed description are exemplary and explanatory and are intended to merely provide further explanation of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 is a flowchart of a photographing profile learning method used by a digital imaging device for recording a personal life history, according to an embodiment of the present invention.

DETAILED DESCRIPTION OF THE EMBODIMENTS

Figure 1:
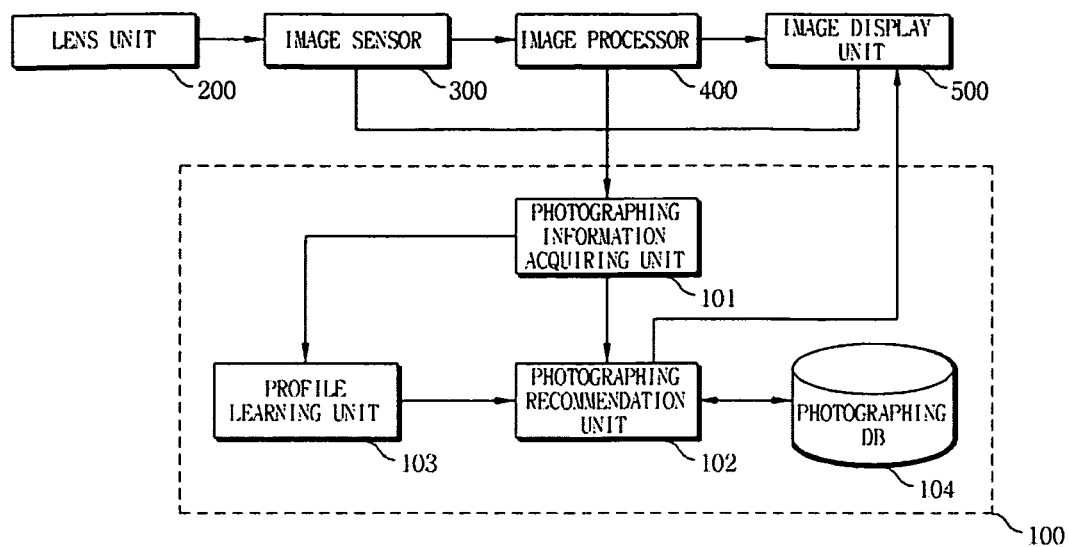
FIG. 1 is a block diagram showing a digital imaging device for recording a personal life history and a photographing profile learning apparatus thereof, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram showing a digital imaging device for recording a personal life history and a photographing profile learning apparatus 100 thereof, according to an embodiment of the present invention. Herein, the term device or apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Referring to FIG. 1, the photographing profile learning apparatus 100 includes a photographing information acquiring unit 101, a photographing recommendation unit 102, and a photographing profile learning unit 103. The photographing profile learning apparatus 100 can further include a photographing database 104.

In FIG. 1, a lens unit 200, an image sensor 300, an image processor 400, and an image display unit 500 are components which are generally installed in a digital imaging device, and therefore, detailed descriptions thereof will be omitted.

The digital imaging device converts light reflected from an object into an electrical signal, digitalizes the electrical signal, and displays the resultant signal to a user or stores it. The digital imaging device may be a general digital camera or a digital camera installed in a cellular phone, Personal Digital Assistant (PDA) or Portable Multimedia Player (PMP). The digital imaging device photographs an object and transmits its picture using wired/wireless data communications to PCs or other mobile terminals. In the current embodiment of the present invention, for convenience of description, it is assumed that the digital imaging device is a digital camera.

In the digital imaging device, light reflected from an object is input to the image sensor 300 via the lens unit 200. The lens unit 200 includes a plurality of optical lenses and an iris diaphragm, and can further include a driving motor for controlling the optical lenses or iris diaphragm to focus the light on the image sensor 300. The image sensor 300 detects the input light and converts the input light into an electrical signal. The image sensor 300 may be a solid state picture sensor, such as a CCD image sensor or CMOS image sensor. The electrical signal is input to the image processor 400 and subjected to predetermined picture processing, and then displayed on the picture display unit 500 or stored in an extra storage unit (not shown).

When a user photographs a certain object, a preview picture is displayed on the picture display unit 500 through the above-described process, and he or she photographs the object while seeing the preview picture. When the preview picture is displayed, the photographing profile learning apparatus 100 recognizes the user's photographing tendencies, and recommends a previous picture which is similar or related to the preview picture from among previously photographed pictures so that a story is made between the previously photographed picture and a picture that is to be currently photographed.

For example, if it is assumed that when the user photographs a person A, he or she has often photographed the person A using a 3× zoom function, the photographing profile learning apparatus 100 searches for pictures where the person A is taken among pictures previously photographed, selects at least one picture taken using the 3× zoom function from among the searched pictures, and displays the selected picture on the picture display unit 500. Thus, the user can control camera settings on the basis of photographing conditions in which the displayed previous picture has been taken, so that the user can take a picture of the person A consistently. Also, the photographing profile learning apparatus 100 can recommend photographing information according to the user's tendencies by learning the user's photographing patterns on the basis of a picture actually photographed after the camera settings are adjusted. A construction of the photographing profile learning apparatus 100 according to the current embodiment of the present invention will be described in more detail below.

In FIG. 1, the photographing information acquiring unit 101 is used to extract photographing information from the preview picture or from a photographed picture. The photographing information includes a type (for example, a person, an animal, scenery, etc.) of the photographed object, a location of the photographed object, a time when the object was photographed, weather conditions in which the object has been photographed, etc. Here, the picture's own information can be acquired by image processing (for example, color histogram analysis, face recognition technology, etc.) of the image processor 400, and other information related to the picture can be acquired by an extra device (for example, a GPS receiver, a clock, etc.) installed in the digital imaging device or by a user's manipulation (for example, inputting weather information, inputting additional explanation about pictures, etc.).

The photographing information acquired by the photographing information acquiring unit 101 is a vector quantity, and is denoted by u(t) or u(t+1) herein. A difference between u(t) and u(t+1) will be described later.

The photographing recommendation unit 102 searches for previous pictures related to the preview picture from the photographing database 104, selects at least one previous picture in which the user's photographing patterns are most reflected, from among the searched previous pictures, and recommends the selected previous picture to the user. For example, the photographing recommendation unit 102 receives photographing information u(t) of the preview picture from the photographing information acquiring unit 101, searches for a proper picture from the photographing database 104 using the photographing information u(t), and causes the searched picture to be displayed as a recommendation picture on the picture display unit 500.

Figure 2:
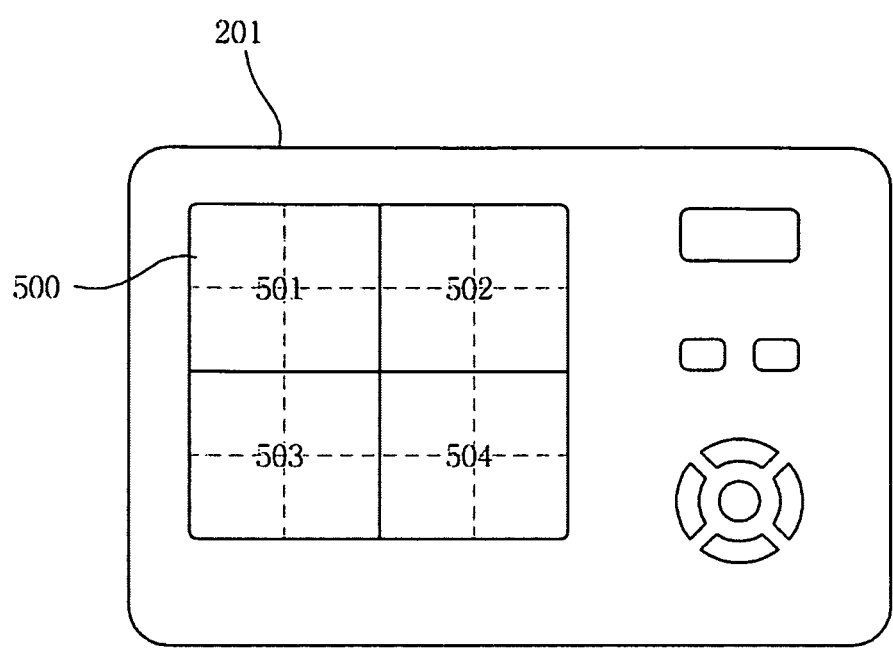
FIG. 2 is a view for explaining a method in which a preview picture and recommendation pictures are displayed, according to an embodiment of the present invention.

FIG. 2 is a view for explaining a method in which a preview picture and recommendation pictures are displayed on a picture display unit 500 of a digital camera 201, according to an embodiment of the present invention.

In FIG. 2, the picture display unit 500 can be divided into four parts. The preview picture is displayed on one of the four parts, and the recommendation pictures are displayed on the remaining three parts.

For example, a recommendation picture based on the type of an object is displayed on the upper left screen 501, a recommendation picture based on the location of the object when the object was taken is displayed on the upper right screen 502, and a recommendation picture based on a time when the object was taken is displayed on the lower left screen 503. Also, the respective recommendation screens 501, 502, and 503 each can be divided into 4 parts or 8 parts to display more recommendation pictures. Also, if the picture display unit 500 is a touch screen allowing touch manipulation, the user can provide a predetermined feedback signal by touching a recommendation picture among a plurality of recommendation pictures displayed on the touch screen.

A method in which the photographing recommendation unit 102 searches for picture data in the photographing database 104 and selects recommendation pictures from the picture data can be implemented using various search algorithms. In the current embodiment of the present invention, there is used a method of searching for and recommending pictures on the basis of a user profile and a recommendation function so that a consistent story is made between a previous picture and a current picture.

For example, the photographing recommendation unit 102 creates a query on the basis of a user profile s(t) and photographing information u(t) of a preview picture to search for previous pictures using the query, and selects at least one recommendation picture from among the searched previous pictures using a recommendation function R(s,a) in which user feedback is reflected.

That is, since photographing information about the previously photographed pictures is stored in the photographing database 104, the photographing recommendation unit 102 can search for at least one previously photographed picture with photographing information which is similar to the photographing information u(t) of the preview picture received from the photographing information acquiring unit 101. Here, by using a query for searching for the previously photographed pictures on the basis of the photographing information u(t) and the user profile s(t), at least one previous picture which is most similar to the preview image can be searched.

The result of the searching based on the photographing information u(t) can be reorganized on the basis of information included in the user profile s(t) which is an information group including the user's personal photographing tendency information, and also the query can be corrected on the basis of the information included in the user profile s(t). The user profile s(t) is updated by the photographing profile learning unit 103, which will be described later.

The recommendation function R(s, a) is used to estimate a goodness degree of the recommended result when recommendation "a" is made in a specific profile state "s". The recommendation function R(s, a) depends on the user feedback. For example, it is assumed that when a current profile is s0, two action vectors a1 and a2 are possible. Here, the action vector a1 is used to select a first picture from among the searched pictures, and the action vector a2 is used to select a second picture from among the searched pictures. If at some prior time the user selects the first picture when the first and second pictures are recommended, a point "1" can be assigned as a user feedback (that is, a kind of compensation value) to the action vector a1 and a point "−1" can be assigned as a user feedback to the action vector a2. Accordingly, in this case, the photographing recommendation unit 102 can select the action vector a1 to recommend the first picture. The recommendation function R(s, a) is also updated according to the user feedback by the photographing profile learning unit 103, so that the user's photographing patterns are reflected in the recommendation function R(s, a) with the elapse of time.

In other words, the photographing recommendation unit 102 recommends a specific picture according to the user's photographing tendencies using the user profile s(t) and recommendation function R(s, a) in which the user's photographing patterns are reflected, in order to maintain correlations and/or consistency between the currently photographed picture and the previously photographed pictures. For this, the user profile s(t) and recommendation function R(s,a) have to learn the user's photographing patterns and provide an appropriate previous picture, and such a learning process is performed by the photographing profile learning unit 103, which will be described later.

The photographing profile learning unit 103 updates the user profile s(t) and the recommendation function R(s, a), by reflecting user feedback regarding the recommendation picture. The user feedback includes re-photographing the corresponding object after resetting photographing conditions (for example, a shutter speed, a zoom setting, white balancing, etc.) by selecting a recommendation picture or with reference to recommendation pictures when the recommendation pictures are displayed on the picture display unit 500 as illustrated in FIG. 2.

For example, if the user selects one of the recommendation pictures, a camera can be automatically set to photographing conditions in which the selected recommendation picture has been taken, and the camera can photograph the corresponding object in the newly set photographing conditions and provide the user feedback to the recommendation picture.

If user feedback is provided, the photographing information acquiring unit 101 extracts photographing information u(t+1) of the currently photographed picture. That is, the photographing information u(t) of the preview picture represents photographing information of the preview picture before the user feedback is reflected, and the photographing information u(t+1) of the photographed picture represents photographing information of the photographed picture after the user feedback is reflected.

The photographing profile learning unit 103 can update the user profile s(t) using the photographing information u(t+1) in which the user feedback is reflected. For example, by providing a predetermined weight β to the photographing information u(t+1) and adding the resultant information to the user profile s(t), a new user profile s(t+1) can be created.

Also, the photographing profile learning unit 103 can update the recommendation function R(s, a) using the newly created user profile s(t+1).

Figure 3:
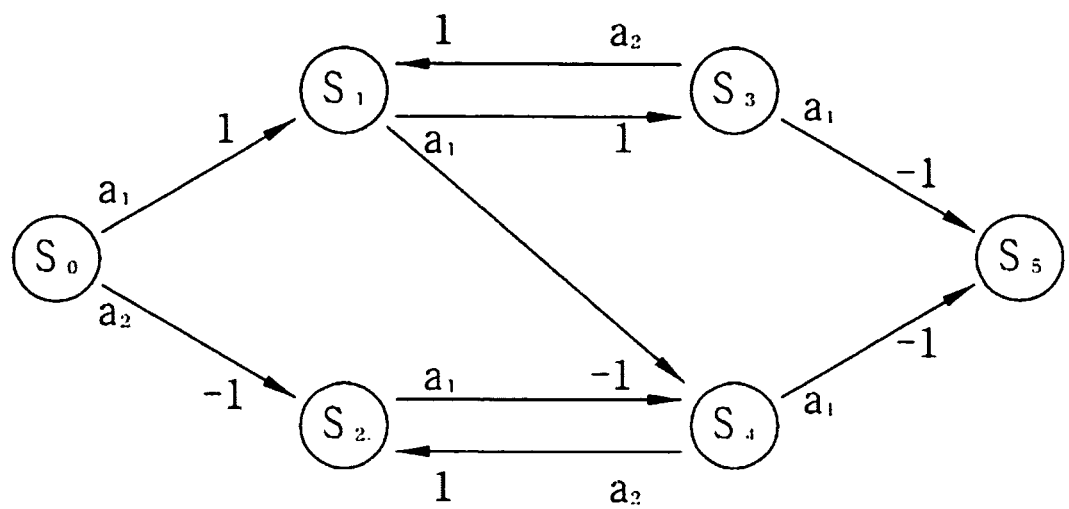
FIG. 3 is a view for explaining the concept of a recommendation function, according to an embodiment of the present invention.

FIG. 3 is a view for explaining a process for updating the recommendation function R(s, a), according to an embodiment of the present invention. The recommendation function R(s, a) may be a function or table which represents a goodness degree (for example, an expected recommendation rate) of an action "a" when the action "a" is executed in a specific profile state "s".

For example, by repeatedly using a table representing an expected recommendation value when an action "a" is executed in a specific user profile state "s", an expected future value of the specific user profile can be calculated. Here, the expected future value means an expected value of a recommendation rate indicating how a updated user profile state s' is in good condition when a new recommendation action a' is conducted in the updated user profile state s'. The expected future value can be calculated by calculating recommendation rates for various actions a' using a current recommendation function R, selecting a maximum of the recommendation rates, subtracting a depreciation ratio with respect to time from the maximum recommendation rate, and then adding a current feedback compensation value r(t) to the resultant value. By assigning weights α and (1-α) respectively to the expected future value and the current recommendation function R, and summing the resultant values, the recommendation function R(s, a) can be updated.

Since the photographing information acquiring unit 101 acquires various picture information other than information about the object, the photographing recommendation unit 102 provides a picture in a past condition which is similar to a condition in which the object is photographed, and in particular, provides a recommendation picture in which the user's photographing tendencies are most reflected, and the photographing profile learning unit 103 continues to learn a criteria for selecting a recommendation picture according to user feedback, it is possible to photograph an object optimally according to the user's tendency and conditions. Also, since a previously photographed picture and a currently photographed picture have consistency as history information, a visual diary can be conveniently produced.

A photographing profile learning method of a digital imaging device for recording a personal life story, according to an embodiment of the present invention, will be described with reference to FIG. 4.

Referring to FIG. 4, in operation S401, photographing information u(t) of a preview picture is extracted. For example, the photographing information acquiring unit 101 analyzes a preview picture displayed on the picture display unit 500, and acquires information about the type and location of the corresponding object, and about the time and weather when the object was taken.

In operation S402, previous pictures related to the preview picture are searched using the photographing information u(t) of the preview picture and a user profile s(t). Among the searched previous pictures at least one recommendation picture in which the user's photographing patterns are most reflected, is selected using a recommendation function R(s, a), and the selected picture is recommended to the user. Here, since the user profile s(t) and the recommendation function R(s, a) are a criterion representing the user's photographing patterns, and continue to be updated or learned by the user feedback, as described above, the user's photographing tendencies are cumulatively reflected in the user profile s(t) and the recommendation function R(s, a) with the elapse of time.

The operation of searching for the related previous pictures can be performed by creating a query on the basis of the photographing information u(t) of the preview picture and the user profile s(t), and searching for the photographing database 104 according to the query. Since the user profile s(t) includes characteristics information about the user's photographing tendencies, it is also possible to search for the related previous pictures without having to search for the photographing database 104. Also, the process of selecting a recommendation picture from among the searched pictures can be performed, using a recommendation function R(s, a) which represents a goodness degree of the recommended result and is estimated by user feedback when recommendation a is made in a specific profile state s.

In operation S403, the user feedback regarding the recommendation picture is received, and the object is actually photographed. For example, after selecting a recommendation picture from among pictures displayed on the picture display unit 500 as illustrated in FIG. 2 and setting a camera to photographing conditions in which the selected recommendation picture has been photographed, the object is actually photographed.

In operation S404, photographing information u(t+1) of the actually photographed picture is extracted. That is, the photographing information u(t+1) is a value in which the user feedback is reflected.

In operation S405, the user profile s(t) and the recommendation function R(s, a) are updated or learned.

The process of updating the user profile s(t) can be expressed by the below Equation 1, for example.

$$s(t+1) = s(t) + \beta u(t+1) \qquad \text{Equation 1:}$$

Here, s(t+1) represents the updated user profile, s(t) represents the non-updated user profile, u(t+1) represents the photographing information for the actually photographed picture (that is, the picture in which the user feedback is reflected) obtained in operation S404, and β represents a learning rate. The learning rate β is a parameter for adjusting a degree of change of the user profile s(t). The greater the learning rate β, the more the current conditions are reflected.

The process of updating the recommendation function R(s, a) can be expressed by the below Equation 2, for example.

$$R(s,a) \leftarrow (1-\alpha)R(s,a) + \alpha \Delta R(s,a) \quad \Delta R(s,a) = r(t) + \gamma \max_{a} R(s',a') \qquad \text{Equation 2:}$$

Here, s represents the user profile state, a represents a recommendation action vector, and r(t) represents the user feedback. In Equation 2, the recommendation function R(s, a) is calculated by assigning weights (1−α) and α respectively to a current value (a first term) and an expected future value (a second term). In the second formula of Equation 2, the recommendation function R(s', a') is used to search for a new recommendation action, and represents a goodness degree of a state s' changed when a new action a' is performed. Recommendation functions R(s', a') for various actions a' are calculated, and an action a' is selected in which a maximum recommendation function MAXa'R(s',a') among the calculated recommendation functions R(s', a') is obtained. By subtracting a depreciation ratio γ with respect to time from the maximum recommendation function MAXa'R(s',a') and adding a current feedback compensation value r(t) to the result of the subtracting, a goodness degree of a future recommendation action can be obtained.

In the photographing profile leaning method, as seen in Equation 3, an expected recommendation function value R(s) in the state s is obtained by applying a depreciation ratio γ (0≦γ≦1) to a goodness degree in the newly changed state s+1, which means that a goodness degree of the use profile s converges to R(s) if various actions a are repeatedly performed in the state s. That is, the expected value R(s) can be expressed by the below Equation 3, for example.

$$R(s) = E\{R_t \mid s_t = s\}$$
$$= E\left\{\sum_{k=0}^{\infty} \gamma^k r_{t+k+1} \,\middle|\, s_t = s\right\}$$
$$= E\left\{r_{t+1} + \sum_{k=0}^{\infty} \gamma^k r_{t+k+2} \,\middle|\, s_t = s\right\}$$
$$= E\{r_{t+1} + \gamma R(s_{t+1}) \mid s_t = s\}$$

Equation 3

In Equation 3, Rt represents an expected recommendation function value when a user feedback value r from t+1 to infinity is received. The expected value Rt is equal to a sum of a feedback value rt+1 at a next time and a value obtained by multiplying a recommendation value R(St+1) in a next state St+1 by a depreciation ratio γ. Here, the depreciation ratio γ represents uncertainty for the future. The smaller the depreciation ratio γ, the less weight on the future and the more weight on user feedback by correlations with the current user.

According to the photographing profile learning method described above, since recommendation pictures consistent with a user's photographing tendencies are provided, and a user profile and a recommendation algorithm are continuously learned using the user's photographing patterns according to the user feedback, it is possible to create a visual diary story with the user's desired patterns.

Embodiments can be implemented in computing hardware (computing apparatus) and/or software, such as (in a non-limiting example) any computer that can store, retrieve, process and/or output data and/or communicate with other computers, for example. Results produced can be displayed on a display of the computing hardware. A program/software implementing embodiments may be recorded on computer-readable media including computer-readable recording media. The program/software implementing embodiments may also be transmitted over transmission communication media. Examples of the computer-readable recording media include at least a magnetic recording apparatus, an optical disk, a magneto-optical disk, and/or a semiconductor memory (for example, RAM, ROM, etc.). Examples of the magnetic recording apparatus include at least a hard disk device (HDD), a flexible disk (FD), and a magnetic tape (MT). Examples of the optical disk include at least a DVD (Digital Versatile Disc), a DVD-RAM, a CD-ROM (Compact Disc-Read Only Memory), and a CD-R (Recordable)/RW. An example of communication media includes a carrier-wave signal. A transmission communication media may be an apparatus that carries such a communication media.

Further, according to one ore more aspects of the present invention, any combination of the described features, functions, and/or operations may also be provided.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A photographing profile learning apparatus for recording a personal life history, comprising:
   a photographing information acquiring unit extracting photographing information of a current image;
   a photographing recommendation unit detecting first images related to the current image among previous images according to the extracted photographing information, detecting second images to which a user's photographing patterns are determined to be most reflected among the detected first images according to a recommendation function, wherein the recommendation function represents a reflection degree of the user's photographing patterns about each of the detected first images, and recommending the detected second images to the user as recommendation images; and
   a photographing profile learning unit updating the recommendation function based on user feedback regarding at least one of the recommendation images.

2. The photographing profile learning apparatus of claim 1, wherein the photographing recommendation unit creates a query including the extracted photographing information of the current image and a user profile to search for the first images.

3. The photographing profile learning apparatus of claim 2, wherein the photographing profile learning unit updates the user profile based on the user feedback regarding the at least one of the recommendation images.

4. The photographing profile learning apparatus of claim 1, wherein the extracted photographing information includes at least one of information about a type of a photographed object, information about a location of a photographed object, information about a time that an object was photographed, and information about weather conditions under which the object was photographed.

5. The photographing profile learning apparatus of claim 1, wherein the user feedback includes at least one of selecting at least one of the recommendation images to control a photographing condition for photographing the current image based on the selected at least one recommendation image.

6. A photographing profile learning method for recording a personal life story, comprising:
   extracting photographing information of a current image;
   detecting, using one or more processing devices, first images related to the current image among previous images according to the extracted photographing information;
   detecting second images to which a user's photographing patterns are determined to be most reflected among the detected first images according to a recommendation function, wherein the recommendation function represents a reflection degree between the current image and the user's photographing patterns respectively represented in each of the detected first images;
   recommending the detected second images to the user as recommendation images; and updating the recommendation function based on user feedback regarding at least one of the recommendation images to control a photographing condition for photographing the current image based on the user feedback.

7. The photographing profile learning method of claim 6, wherein the extracted photographing information includes at least one about a type of a photographed object, information about a location of a photographed object, information about a time that an object was photographed, and information about weather conditions under which an object was photographed.

8. A photographing profile learning method, comprising:
extracting photographing information of a current image;
receiving a user's profile;
detecting, using one or more processing devices, first images related to the current image among previous images according to the extracted photographing information and the received user's profile;
detecting second images to which a user's photographing patterns are determined to be most reflected among the detected first images according to a recommendation function, wherein the recommendation function represents a reflection degree between the current image and the user's photographing patterns respectively represented in each of the detected first images;
recommending the detected second images to the user as recommendation images; and
updating the recommendation function and the user's profile based on user feedback regarding at least one of the recommendation images to control a photographing condition for photographing the current image based on the user feedback.

* * * * *

UNITED STATES PATENT AND TRADEMARK OFFICE
CERTIFICATE OF CORRECTION

| | | |
|---|---|---|
| PATENT NO. | : 8,520,096 B2 | |
| APPLICATION NO. | : 12/213289 | |
| DATED | : August 27, 2013 | |
| INVENTOR(S) | : Byoung-tak Zhang et al. | |

It is certified that error appears in the above-identified patent and that said Letters Patent is hereby corrected as shown below:

On the Title Page, In Column 2, item [74] (Attorney, Agent, or Firm), Line 1, Delete "Stass & Halsey LLP" and insert -- Staas & Halsey LLP --, therefor.

Signed and Sealed this
Eighteenth Day of February, 2014

Michelle K. Lee
*Deputy Director of the United States Patent and Trademark Office*